United States Patent [19]

Takayama

[11] Patent Number: 4,915,129

[45] Date of Patent: Apr. 10, 1990

[54] CHECK VALVE

[75] Inventor: Akio Takayama, Ibaraki, Japan

[73] Assignee: Kyosan Denki Kabushiki Kaisha, Tokyo, Japan

[21] Appl. No.: 319,152

[22] Filed: Mar. 3, 1989

[30] Foreign Application Priority Data

Mar. 24, 1988 [JP] Japan ............................ 63-37658[U]

[51] Int. Cl.[4] ............................................. F16K 15/02
[52] U.S. Cl. ................... 137/514; 137/543.15
[58] Field of Search ........................... 137/514, 543.15; 251/64

[56] References Cited

U.S. PATENT DOCUMENTS 3,048,188  8/1962  Hunter ........................ 137/543.15 X

FOREIGN PATENT DOCUMENTS 2739801  3/1979  Fed. Rep. of
                 Germany ........................ 137/543.15
61-21649  6/1986  Japan .
 655560  7/1951  United Kingdom ........... 137/543.15

Primary Examiner—Robert G. Nilson
Attorney, Agent, or Firm—Flynn, Thiel, Boutell & Tanis

[57]  ABSTRACT

A check valve comprises a frustoconical projection extending upwardly from a bottom surface of the valve body within a valve chamber and an elastic member provided with a plurality of elastic pieces extending downwardly from the valve for sliding on an outer surface of the frustoconical projection in the manner to bring into contact with the outer surface of the frustoconical projection, whereby the check valve characteristic is normally kept stable.

2 Claims, 1 Drawing Sheet

CHECK VALVE

BACKGROUND OF THE INVENTION

1. Field of the Invention:

The present invention relates to a check valve having a valve positioned within a valve chamber and normally urged toward a valve seat, an inlet port and outlet port positioned at upper and lower portions of the valve chamber in which the valve is released from the valve seat by a fluid pressure for allowing the fluid to flow from the inlet port to the outlet port.

2. Description of the Prior Art:

A prior art of this type of disclosed in Japanese Utility Model Publication No. 61-21649 and will be described with reference to FIG. 3.

A prior Check valve 30 comprises an upper valve body 33 having an inlet port 32 at the upper portion thereof and a valve seat 31 at the lower portion thereof, a lower valve body 35 having an oulet port 34 at the lower portion thereof, a valve chamber 36 defined between the upper and lower valve bodies 33, 35, a movable stem 38 positioned within the valve chamber 36 and having a valve 37 which can be brought into contact with the valve seat 31, a spring 41 positioned in the valve chamber for urging the movable stem 38 for thereby permitting the valve 37 to be brought into contact with the valve seat 31, wherein the valve 37 is released from the valve seat 31 by fluid pressure for allowing the fluid to flow from the inlet port 32 to the outlet port 34. The check valve 30 further includes a damper 40 made of an elastic rubber supported by the movable stem 38 and having a plurality of damper pieces which can slide on an inner cylindrical surface 39 of the lower body 35 forming a fluid passage in the manner that the damper pieces are brought into contact with the inner cylindrical surface 39 with some frictional force.

However, according to the prior check valve there are following problems.

(1) A check valve characteristic, namely, the characteristic that the valve is released from or contacts the valve seat, is likely to be changed because of variation of elasticity of the damper and variation of frictional force of the damper against the inner cylindrical surface when an axis of the stem guide provided in the upper body 33 is displaced from the axis of the lower body 35 and the axis of the movable stem 38 to cause the damper not to come into contact properly with the inner cylindrical surface of the lower valve 35 forming the fluid passage since the check valve is not provided with an axis displacement regulation mechanism. Hence, parts of the check valve must be manufactured with high accuracy to prevent the axial displacement from occuring in the course of manufacturing said assembling the check valve.

(2) Furthermore, the check valve characteristic is also likely to be changed because of variation of elasticity of the damper and variation of frictional force of the damper against the inner cylindrical surface since the inner periphery of the damper is clamped by the movable stem 38 while the outer periphery of the damper is clamped by the inner cylindrical surface of the lower body so that the damper is restricted in its operation when the variation of elasticity of the damper and variation of frictional force of the damper against the inner cylindrical surface of the lower valve body is changed by expansion of the fluid and by environmental variation such as the variation of the temperature, and the like.

In view of the problems as set forth above, it is an object of the present invention to provide a check valve to cope with the axial displacement of the damper and the environmental variation for preventing the check valve characteristic from varying at maximum extent.

To achieve the above object, the check valve according to the present invention comprises a first valve body provided with an inlet port at the upper portion thereof for introducing fluid, a valve seat at the lower portion thereof; a second valve body having an outlet port extending downward therefrom at the lower portion thereof for discharging the fluid; a valve chamber defined by fixing the first valve body to the second valve body; a valve positioned in the valve chamber; a spring positioned in the valve chamber for allowing the valve to be brought into contact with the valve seat by the resiliency of the spring, wherein the valve is released from the valve seat by fluid pressure for allowing the fluid introduced from the inlet port to flow in the valve chamber and discharge from the outlet port; characterized in that the check valve further comprises a frustoconical projection extending upwardly from a bottom surface of the second valve body in coaxial relation with the outlet port, and an elastic member provided with a plurality of elastic pieces extending downwardly from the valve for sliding on an outer surface of the frustoconical projection in the manner to come into contact with the outer surface of the frustoconical projection.

The above and other objects, features and advantages of the present invention will become more apparent from the following description taken in conjunction with the accompanying drawings.

DESCRIPTION OF THE PREFERRED EMBODIMENT

Figure 1:
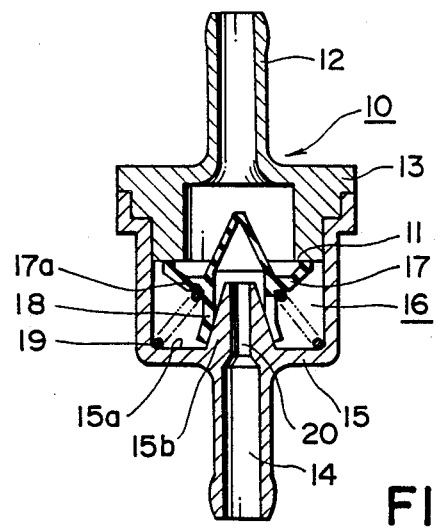
FIG. 1 is a cross sectional view of a check valve according to a preferred embodiment of the present invention.
Figure 2:
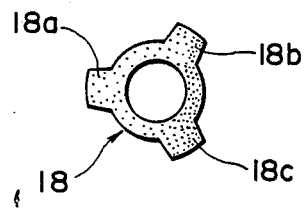
FIG. 2 is a plan view of an elastic member employed in the preferred embodiment of the present invention.
Figure 3:
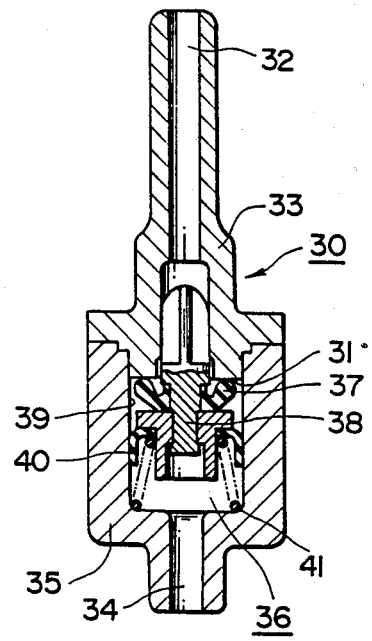
FIG. 3 is a cross sectional view of a check valve according to a prior art check valve.

A check valve according to a preferred embodiment of the present invention will be described with reference to FIGS. 1 and 2.

The check valve 10 has a first body 13 provided with an inlet port 12 at the upper portion thereof and a valve seat 11 at the lower portion thereof, and a second body 15 having an outlet port 14 at the lower portion thereof and a valve chamber 16 defined by fixing the first body 13 to the second body 15. A valve 17 made of rubber is positioned in the valve chamber 16. The valve 17 has an elastic member 18 provided with a plurality of elastic pieces 18a, 18b, 18c spaced in the euql angular interval and extended downwardly from the valve 17 as shown in FIG. 2. The elastic pieces 18a, 18b, and 18c are slidable to be brought into contact with an outer surface of a frustoconical projection 15b fixed to a bottom surface 15a of the second body 15. The elastic member 18 can be incorporated into the valve 17 or can be provided independently from the valve 17. The elastic pieces are not limited to three pieces but may be those in a plurality of numbers. The valve 17 is normally urged toward the first body 13 by springs 19 which are pressedly provided between spring attachment portions 17a and the second body 15, and pressed by the valve seat 11 so that the valve 17 is closed or contacts the valve seat 11. The frustoconical projection 15b has a fluid passage 20 at the center thereof in a coaxial relation with the outlet port 14 for communicating between the valve chamber 16 and the outlet port 14.

With an arrangement of the preferred embodiment of the present invention, the check valve 10 is operated as follows.

If a fluid pressure at the side of the inlet port 12 is greater than a first set pressure determined by the fluid pressure at the side of the outlet port 14 plus the resilience force of the spring 19 and the elastic force of the elastic member 18 which is brought into contact with the outer surface of the frustoconical projection 15b, the valve 17 is released from the valve seat 11 so that the fluid introduced from the inlet port 12 flows through the opening between the valve seat 11 and the valve 17, to the valve chamber 16, into the fluid passage 20 and discharges from the outlet port 14. With the releasing movement of the valve 17 from the valve seat 11, the elastic member 18 moves downward along the outer surface of the frustoconical projection 15b for thereby increasing the contact area of the elastic pieces 18a, 18b, 18c against the outer surface of the frustoconical projection 15b.

At the time of releasing movement of the valve 17, the fluid pressure at the inlet port 12 and the fluid pressure at the outlet port 14 is liable to become equal whereby the difference of fluid pressure between the inlet port 12 and the the outlet port 14 is less than the first set pressure. As a result, the valve 17 is likely to be brought into contact with the valve seat 11 by the resilience force of the spring 19. That is, the difference of fluid pressure between the inlet port 12 and the outlet port 14 for allowing the valve 17 to release from the valve seat 11 and the difference of fluid pressure between the inlet port 12 and the outlet port 14 for allowing the valve 17 to contact the valve seat 11 are substantially the same so that the hysteresis between the pressure for allowing the valve 17 to release from the valve seat 11 and the pressure for allowing the valve 17 to contact the valve seat 11 is substantially zero. As a result, after the valve 17 is released from the valve seat 11, the valve 17 is immediately likely to contact the valve seat 11.

Since the elastic pieces 18a, 18b, 18c are brought into contact with the outer surface of the frustoconical projection 15b, when the valve 17 is operated to contact the valve seat 11, the elastic member 18 is likely to keep the valve 17 released from the valve seat 11 with the elastic force of the elastic pieces 18a, 18b and 18c. When the fluid pressure at the side of the inlet port 12 is less than a second set pressure determined by the fluid pressure at the outlet port 14 and the difference between the resilience force of the spring 19 and the frictional force or the elastic force of the elastic member 18, the valve 17 moves toward the valve seat 11 and finally contacts the valve seat 11.

At the time of closing of the valve 17, the valve 17 collides against the valve seat 11 to generate a repellant force. The resultant repellent force is delivered to the spring 19 for causing oscillations so that the valve 17 is frequently released from and in contact with the valve seat 11. However, the oscillations will be prevented from being generated due to a cushion caused by frictional force of the elastic member 18 at the time when the elastic pieces 18a, 18b, 18c slide on and come into contact with the outer surface of the frustoconical projection 15b.

If the axis of the elastic member 18 is displaced from the axis of the frustoconical projection 15b for causing the elastic pieces 18a, 18b, 18c difficulty in contacting the outer surface of the frustoconial projection 15b, the elastic force of each of the elastic pieces 18a, 18b, 18c is varied. However, since the elastic pieces 18a, 18b, 18c are arranged on the outer surface of the projection 15b with some angular interval, each piece acts to make uniform the elastic force of the elastic member 18 as a whole. As a result, even if the axis of the elastic member 18 is displaced from the axis of the frustoconical projections 15b, the elastic member 18 can come into contact with the outer surface of the frustoconial projection 15b to prevent the displacement of the axes of the elastic member 18 and the frustoconical projection 15b.

Furthermore, affecting of the check valve by environmental variation to (such as variation of temperature) can be reduced to the extent that as the elastic member 18 moves toward the bottom of the frustoconical projection 15b since the frictional force and the elastic force are produced by surface contact between the elastic pieces 18a, 18b, 18c and the sloped outer surface of the frustoconical projection 15b.

With the arrangement of the check valve according to the present invention, inasmuch as the check valve has a frustoconical projection mounted at a valve body forming a fluid passage and the elastic member is provided with a plurality of elastic pieces extended downwardly from the valve and arranged in angular interval for sliding on an outer surface of the frustoconical projection, each elastic piece acts to make uniform the elastic force of the elastic member provided at the valve even if there occurs displacement between the axis of the elastic member and the frustoconical projection. As a result, the displacement of the axes of the valve and the projection will be prevented to thereby keep normally the check valve characteristic stable without increasing the accuracy of parts constituting the check valve.

Still furthermore, inasmuch as the frictional force and the elastic force of the elastic pieces are formed by close contact of the elastic pieces with the outer surface of the frustoconical projection, the environmental effect will be reduced to the extent that the elastic pieces moves toward the bottom of the frustoconical projection, whereby the variation of the check valve characteristic can be prevented.

Although the invention has been described in its preferred form with a certain degree of particularity, it is to be understood that many variations and changes are possible in the invention without departing from the scope thereof.

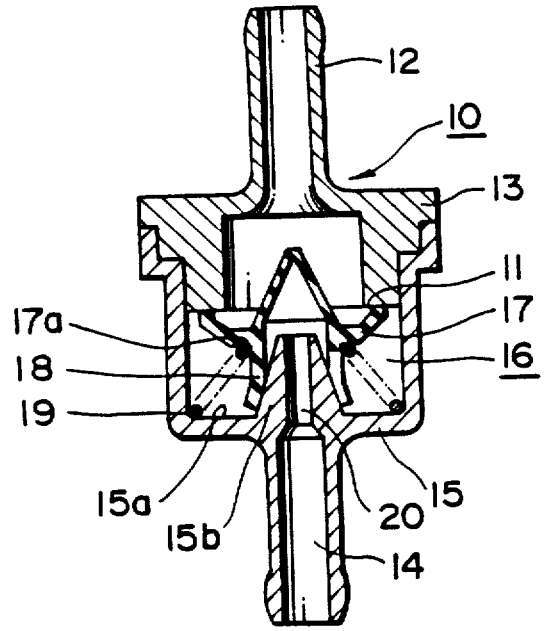

What is claimed is:

1. A check valve comprising:
    a first valve body provided with an inlet port at the upper portion thereof for introducing fluid and a valve seat at the lower end thereof;
    a second valve body having an oulet port extending downward therefrom at the lower portion thereof for discharging the fluid;
    a valve chamber defined by fixing the first valve body to the second valve body;

a valve positioned in the valve chamber;

springs positioned in the valve chamber for allowing the valve to be brought into contact with the valve seat by a resiliency of the springs, wherein the valve is released from the valve seat by fluid pressure for allowing the fluid introduced from the inlet port to flow in the valve chamber and discharge from the outlet port;

characterized in that the check valve further comprises a frustoconical projection extending upwardly from a bottom surface of the second valve body within the valve chamber and an elastic member incorporated into the valve and provided with a plurality of elastic pieces extending downwardly from the valve for slidingon an outer surface of the frustoconical projection and in contact with the outer surface of the frustoconical projection.

2. A check valve according to claim 1, wherein a plurality of elastic pieces are three pieces spaced in the equal angular interval.

* * * * *

UNITED STATES PATENT AND TRADEMARK OFFICE
CERTIFICATE OF CORRECTION

PATENT NO. : 4,915,129

DATED : April 10, 1990

INVENTOR(S) : Akio Takayama

It is certified that error appears in the above-identified patent and that said Letters Patent is hereby corrected as shown below:

The title page, showing the illustrative figure, should be deleted to be replace with the attached title page.

Signed and Sealed this

Fourth Day of February, 1992

Attest:

HARRY F. MANBECK, JR.

*Attesting Officer*   *Commissioner of Patents and Trademarks*

United States Patent
Takayama

[11] Patent Number: 4,915,129
[45] Date of Patent: Apr. 10, 1990

[54] CHECK VALVE

[75] Inventor: Akio Takayama, Ibaraki, Japan

[73] Assignee: Kyosan Denki Kabushiki Kaisha, Tokyo, Japan

[21] Appl. No.: 319,152

[22] Filed: Mar. 3, 1989

[30] Foreign Application Priority Data

Mar. 24, 1988 [JP] Japan ................. 63-37658[U]

[51] Int. Cl.⁴ .................................... F16K 15/02
[52] U.S. Cl. ........................... 137/514; 137/543.15
[58] Field of Search .............. 137/514, 543.15; 251/64

[56] References Cited
U.S. PATENT DOCUMENTS
3,048,188 8/1962 Hunter ............... 137/543.15 X FOREIGN PATENT DOCUMENTS
2739801 3/1979 Fed. Rep. of Germany ......... 137/543.15
61-21649 6/1986 Japan.
655560 7/1951 United Kingdom ..... 137/543.15

Primary Examiner—Robert G. Nilson
Attorney, Agent, or Firm—Flynn, Thiel, Boutell & Tanis

[57] ABSTRACT

A check valve comprises a frustoconical projection extending upwardly from a bottom surface of the valve body within a valve chamber and an elastic member provided with a plurality of elastic pieces extending downwardly from the valve for sliding on an outer surface of the frustoconical projection in the manner to bring into contact with the outer surface of the frustoconical projection, whereby the check valve characteristic is normally kept stable.

2 Claims, 1 Drawing Sheet